United States Patent [19]

Banczak et al.

[11] 4,021,252

[45] May 3, 1977

[54] JET PRINTING INK COMPOSITION

[75] Inventors: Daniel Philip Banczak, Neenah; William Eric Tan, Appleton, both of Wis.

[73] Assignees: American Can Company, Greenwich, Conn.; M & T Chemicals Inc., ; part interest to each

[22] Filed: Feb. 7, 1975

[21] Appl. No.: 547,979

Related U.S. Application Data

[63] Continuation-in-part of Ser. No. 411,375, Oct. 31, 1973, abandoned.

[52] U.S. Cl. .................. 106/30; 106/26; 260/33.2 R; 260/33.4 PQ
[51] Int. Cl.² ............... C09D 11/08; C09D 11/14
[58] Field of Search .................. 106/27–30

[56] References Cited

UNITED STATES PATENTS

| | | | |
|---|---|---|---|
| 2,343,781 | 3/1944 | Locke | 106/30 |
| 2,436,954 | 3/1948 | Denton | 106/26 X |
| 2,450,959 | 10/1948 | Heinecke | 106/30 |
| 3,615,752 | 10/1971 | Hoffman | 106/30 |
| 3,687,887 | 8/1972 | Zabiak | 260/29.6 |
| 3,705,043 | 12/1972 | Zabiak | 106/30 |
| 3,846,141 | 11/1974 | Ostergren et al. | 106/32 |
| 3,884,707 | 5/1975 | Dick et al. | 106/24 |
| 3,912,520 | 10/1975 | Miyajima et al. | 106/22 |

Primary Examiner—Theodore Morris
Attorney, Agent, or Firm—Robert P. Auber; Ira S. Dorman; George P. Ziehmer

[57] ABSTRACT

An ink composition suitable for ink jet printing on metal surfaces, the ink incorporating, in solution, a colorant, a resin component, an alcohol-water solvent and optionally an electrolyte, proportioned to give the ink properties of low surface tension, low viscosity and a low resistivity, all these properties, together with the pH of the composition, being controlled to give excellent workability and stability of the ink in jet printing operations.

28 Claims, No Drawings

JET PRINTING INK COMPOSITION

This application is a Continuation-in-Part of Application Ser. No. 411,375, filed Oct. 31, 1973 and now abandoned.

BACKGROUND OF THE INVENTION

The invention of this application relates to an ink composition for use in a printing apparatus operating on the so-called "ink jet printing" principle. Ink jet printing is a recent development in the art of applying identifying and decorative indicia to a base. In general terms, a fluid ink is forced, under pressure, through a very small orifice in an orifice block which contains a piezoelectric crystal vibrating at high frequency (50–100,000 vibrations per second) causing the ink passing through the orifice to be broken into minute droplets equal in number to the crystal vibrations. The minute droplets are passed through a charging area where individual droplets receive an electrical charge in response to a video signal, the amplitude of the charge being dependent on the amplitude of the video signal. The droplets then pass through an electrical field of fixed intensity, causing a varied deflection of the individual droplets dependent on the intensity of the charge associated therewith, after which the deflected drops are allowed to infringe on the base medium which is to receive the decorative or informative printed indicia. Apparatus suitable for carrying out the ink jet printing process is described in detail in U.S. Pat. Nos. 3,465,350 and 3,465,351, issued Sept. 2, 1969, and it is in connection with an apparatus and process such as are described in the aforementioned patents that the ink of the present invention is designed to function.

Inks suitable for use in the ink jet printing system, or ink jet inks as they will be referred to hereinafter, have been developed which form satisfactory images on paper substrates or other materials of similar surface character. The problems of printing on a metal surface or a metal surface bearing an organic surface coating such as an epoxy type resin, for example, differ substantially from those of printing on paper, and heretofore no ink has been developed which is compatible with both the requirements of the ink jet printing system and the requirements of metal surface printing as well. It is therefore an object of this invention to provide an ink suitable for ink jet printing on metal cans such as those used for the packaging of foods and beverages. It is a particular object of this invention to provide a jet printing ink for printing indicia on aluminum cans which are to be subsequently submitted to pasteurization. It is to be noted that, in discussing the ink jet printing of metal surfaces in this application, it is intended that metal container surfaces bearing a very thin coating of an organic resinous material, such as the coatings commonly applied to exterior surfaces in the manufacture of metal food and beverage containers, be included.

In order to operate satisfactory in an ink jet printing system, an ink must display a consistent breakup length, drop velocity and drop charge under set machine operating conditions. To achieve these ends, the ink must meet strict requirements with regard to viscosity and resistivity, solubility and compatibility of component, stability and anti-skinning properties and must readily re-dissolve in a suitable solvent for rapid cleanup of the machine components with a minimum of effort.

It has been determined that the workable range of viscosity of an ink which is to be used in a jet printing apparatus in which the nozzle orifice is 0.003 in. in diameter, must be no more than about 5 cps. at 68° F., with about 1.90–2.0 being the most desirable viscosity level for superior performance. The viscosity may be somewhat higher than the above values if the orifice diameter is increased to 0.005 in., for example, but in any case an ink of less than 10 cps. and preferably less than about 5 cps. at 68° F., is highly desirable. Resistivity may range from somewhat less than 100 ohm-cm. to about 1000 ohm-cm., the most desirable value being between about 150 and 300 ohm-cm. Resistivity in excess of about 1000 ohm-cm. creates problems in obtaining the proper charge on the droplets and therefore the deflectability of the droplets in an electric field is erratically impaired.

The orifice through which the ink must pass is normally in the range of 0.002 in. to 0.005 in. in diameter. In order to prevent plugging of this orifice, it is highly desirable that all components of the ink be in solution in the carrier medium rather than in a colloidal or other suspended state. In any case, the complete ink composition must pass at least a 2 micron filter in order to be satisfactory for use. Further, the ink components must not sludge out or otherwise deposit in any of the transporting lines, the supply tank, the orifice or any other portion of the ink supply system, even though the solvent medium of the ink is subject to a certain amount of evaporation in the ink return system and the supply tank. In other words, the solvent medium must have a reserve solubility for the solute components of the ink in order to prevent any undesired precipitation which could clog or plug the minute jet orifice. The ink must also possess anti-skinning properties to prevent skinning over of the orifice or the tank during periods of shut-down. Any skin formed in such circumstances could then break up into small solid particles which could plug the orifice.

In order to facilitate cleanup of the apparatus after use, the ink components should be readily soluble in a common solvent medium. This will prevent any gradual buildup of ink residues in the system which could result in malfunction.

The ink properties set forth above are primarily established by the requirements of the jet printing apparatus. In addition to these requirements, the ink must possess certain other properties which are specifically related to its intended use in the printing of metal cans and, in particular, coated or uncoated aluminum can bodies intended for the packaging of foodstuffs and beverages.

For example, the ink must properly wet the aluminum can surface on which the printed indicia are to appear. If the ink is of such composition that it fails to readily wet the metal surface, the ink will bead up on the surface and fail to adhere properly to it. In extreme cases, the beaded drops will coalesce into larger droplets which run and make the printing completely unintelligible. The problem is often accentuated by oily or greasy residues left on the metal surface from earlier stages of fabrication of the container. On the other hand, if the ink is of such composition as to wet the metal surface too readily, the ink drops will flatten out and spread by "crawling" on the metal surface, diluting the color intensity of the ink and overlapping the image of adjacent dots and spreading out sufficiently to make the printed image fuzzy and the characters unintelligible.

In addition to the requirement of proper wetting of the metal surface to be printed, the droplets of ink must adhere strongly to the surface, after application and drying, so that the printed matter is resistant to both physical rubbing or abrasive action and also is resistant to moisture. The ability of the ink to form and retain a desired image on a metal surface in the presence of moisture and the ability to resist removal by moisture is of great importance in this application because the metal can surfaces are generally damp before, during and after the printing operation. It is particularly difficult to maintain satisfactory adhesion of the ink to metal cans which are subjected to pasteurization, the combination to mositure and high temperature utilized in this process tending to cause the coloring matter to bleed, and to severely reduce the adherance of the ink to the can body so that it is readily removed by subsequent rubbing or abrasion.

FIELD OF THE INVENTION

It is an object of this invention to provide an ink for use in the ink jet printing of indicia on coated or uncoated metal cans which combines properties necessary for satisfactory operation of the ink in the printing apparatus with the properties necessary for obtaining and preserving a satisfactory printed image on the particular substrate in question.

It is a further object of this invention to provide an ink suitable in all respects for applying identifying indicia to the end surfaces of aluminum cans used for the packaging of foodstuffs and beverages.

Further objects will become apparent from the following specification and claims.

Most conventional fluid printing inks include three basic components. The first is a colorant for providing visibility of the printed indicia in contrast to the substrate surface. The colorant may be either a dye which is soluble in the ink solvent medium, or a pigment which is suspended in the solvent medium. The second component is a resin or binder which remains on the substrate surface after printing and serves to adhere and bind the dye or pigment in position on the substrate surface. The third major component is the solvent which provides fluidity to the ink and carries in solution or suspension the resin and colorant. In addition to these three components which are found in nearly all fluid printing inks, various other ingredients may be utilized. including drying, dispersing and wetting agents, plasticizers, diluents and the like. Ink jet printing inks, in addition to the three basic components above mentioned, may also desirably contain a fourth, optional component made appropriate to the ink composition by the nature of the apparatus and process of ink jet printing. This is an electrolyte, which is desirably added so that the ink droplets may be given a strong, reproducibly variable electric charge which in turn enables a controlled, reproducible deflection of the droplets by application of an electrical field to the droplet stream. Printing processes other than ink jet printing do not require inks with electrical properties capable of achieving these ends.

Although jet printing inks contain a colorant, a solvent and a binding agent in common with conventional inks, certain functions are required of these components in jet printing inks in addition to those required in conventional inks and, in particular, the ink jet printing of metal substrates such as aluminum, steel and tinned steel cans imposes particular functional requirements on these components. The achievement of a satisfactory balance of the functional requirements of the ink by proper compounding is, in essence, the subject matter of this invention and it is for this reason that the special functions required of the various ink components in metal printing jet inks are discussed herein in some detail.

The properties of the solvent and the characteristics which are imparted to the ink by the solvent are of paramount importance in the present invention. It has been previously pointed out that the overall ink composition must be of very low viscosity. Satisfactory results are readily obtainable with inks having a viscosity as high as about 5 cps. at 68° F., and it is possible to operate with ink having a viscosity approaching 10 cps., although the jet printing process becomes increasingly difficult to control as the ink viscosity increases. A viscosity of about 1.90 cps. is considered optimal. Since the resinous component tends to increase the viscosity of the solvent medium, it is therefore necessary to have the solvent display a very low viscosity to prevent an undesirable viscosity buildup as a result of compounding. Few solvents are capable of meeting the stringent viscosity requirements as well as the other functional requirements of the ink jet printing inks of this invention. Only the aliphatic monohydric alcohols of low molecular, weight, including methyl, ethyl, n-propyl and isopropyl alcohols, either individually or in blends thereof, exhibit the proper combination of low viscosity, solubility for basic dyes and for electrolytes, water miscibility and surface tension characteristics required in this application. Hereinafter, the term "lower, aliphatic monohydric alcohols" will be used to refer to the four alcohols mentioned above.

Generally speaking, ink compositions having the lowest viscosity are those wherein the alcoholic solvent component is methyl alcohol or a blend of methyl and ethyl alcohols. The substitution of one of the propyl alcohols for methyl alcohol in a given ink composition will result in an ink of somewhat higher viscosity, as will be illustrated by examples hereinafter. Optimum performance is obtained in jet printing apparatus having a nozzle orifice diameter of 0.003 inches, as is common in the industry, with inks having a viscosity between about 1.75 and 3 cps. at 68° F., viscosities in this range being obtained with methyl alcohol or a blend of methyl and ethyl alcohol as the organic solvent. Comparable inks made with a propyl alcohol solvent will have viscosities in the range of 3–5 cps. or more. The standard ink jet printing apparatus with nozzle orifices of 0.003 inches will operate satisfactorily with inks of up to about 5 cps. or slightly above, whereas inks of higher viscosity (up to about 8–10 cps.) may also be considered acceptable, but require larger nozzle orifices, higher driving pressures and substantial alterations in the electrical system and geometry of the printing apparatus. It is, therefore, practically and economically preferable that inks of less than about 5 cps. be employed. It is to be noted that the viscosity of the ink compositions is not governed by the solvent viscosity alone, but is also affected by the concentrations of the other ink components as well, including particularly the resinous component, water, and optional modifying additives as will be discussed in greater detail hereinafter.

The propensity for the solvent to wet the substrate, as measured by the property of surface tension of the solvent and of the ink composition incorporating it, is of great importance and must be carefully controlled. Water, for example, will not properly wet a metallic aluminum substrate such as an aluminum can because of its undesirably high surface tension (72 dyne cm. at standard temperature), and inks having a water base are not satisfactory for use in metal can printing, although such inks have been employed in jet printing of paperboard, for example, since paperboard surfaces are readily wet by water. On the other hand, methyl, ethyl, propyl and isopropyl alcohols, which have surface tensions of 22, 23, 24 and 22 dyne cm., respectively, at standard temperature, wet aluminum so readily that the metal surface is flooded by the solvent, which spreads out and merges with other droplets to obscure the limits of any indicia printed by use of these solvents. The inks of the present invention, as used on an aluminum surface, are compounded to have surface tensions at 68° F., of between about 28 and 40 dyne cm. For use on other metal surfaces, such as steel and tinplate, and on organic coating surfaces such as those commonly used in steel can manufacture, surface tension values of the printing inks between about 22 and 35 dyne cm. are necessary, the lower portion of this range being generally preferred.

In order to be effective in the formulation of a jet printing ink for metal cans, the solvent medium must readily dissolve sufficient amounts of the resin, component, the dye and any desirable optional components such as an electrolyte to achieve the desired level of adhesiveness, conductivity and visual impact of the ink composition. Further, since some degree of evaporation of solvent will occur in the ink supply and ink return systems, thereby increasing the solids concentration of the composition in these areas, the solvent must have a reserve solvent power sufficient to prevent precipitation in this situation.

Although evaporation of the solvent from the ink supply and return systems is generally undesirable, it is important that the solvent evaporate relatively rapidly from the printed image area in order to leave the printed indicia smearproof and moistureproof fairly promptly after the printing operation is carried out. The solvent must achieve a satisfactory balance in evaporative porperties between these opposed objectives.

The resin component of a jet printing ink suitable for printing on metal must also meet a variety of requirements. Of primary importance is the ability of the resin to adhere strongly to the metal surface on which the ink is printed and to maintain this strong adhesion under widely varying conditions of humidity and temperature. When the ink is applied to the metal surface, it must "set" or adhere quickly and strongly to the metal, even in the presence of some moisture, and must exhibit a high degree of moistureproofness, not only to maintain adhesion to the metal but also to protect the dye, which may be water-sensitive, from the effects of moisture which may make the dye bleed into surrounding areas.

The resin component must also be very readily soluble in the solvent medium to form a stable, low viscosity solution so that effective amounts can be dissolved in the solvent without unduly increasing the viscosity of the composition. Similarly, the electrolytic component used in the preferred embodiments of the invention must also be effective at concentrations well below its solubility limit in order to achieve the desired drop deflection characteristics without danger of precipitation and plugging of the system.

DESCRIPTION OF THE PREFERRED EMBODIMENT

As previously mentioned, the inks of this invention contain a dye, a solvent blend, a resinous component and preferably an electrolyte in an amount effective to achieve desired drop deflection characteristics, all of which must be in carefully balanced proportion to achieve successful operation of the ink in a jet printing apparatus.

The Solvent Blend — Although minor amounts of other solvents may be included in the overall ink composition for specific purposes, the primary solvent blend is a mixture of one or more of the lower aliphatic alchohols previously mentioned and water, in such proportions that the surface tension of the ink is less than about 40 dyne cms., measured at 68° F. For printing on the surface of aluminum metal, the weight ratio of water to the alcohol component should be in the range between 1 to 1.5 and 1 to 5, the preferred, or optimum ratio, being about 1 to 3, since this ratio yields inks having surface tensions of about 30–35 dyne cms. If the solvent blend contains a higher than desired concentration of water, the resulting ink will tend to bead up on the metal surface, whereas a particularly high concentration of the alcohol causes the ink to spread unduly on the metal surface with resultant smearing or diffusion of the printed indicia. Since the wetting characteristics of steel and tin plated steel vary somewhat from those of aluminum, when these metals are the substrate on which the printing is to be applied, the solvent ratio must be adjusted somewhat, a suitable water-to-alcohol ratio being from 1 to 3 to about 1 to 10, with a ratio of about 1 to 8 being preferred, yielding inks in the desired surface tension range of 22–30 dyne cms.

In addition to methanol and water, the solvent blend in the preferred ink compositions often contains some ethanol, used as the primary solvent for the resinous component. As previously stated, ethyl alcohol and the propyl alcohols have higher viscosities than methyl alcohol and the viscosity of a particular ink composition will, of course, vary substantially depending on which of these alcohols are incorporated and in what proportions. The choice of the alcoholic component will depend on the specific characteristics desired in the final ink. If rapid drying and/or very low viscosity are required, the alcoholic component will necessarily be primarily methyl alcohol. If slower drying and a somewhat higher viscosity may be tolerated in a given situation, part or all of the mehyl alcohol may be replaced with ethyl, n-propyl or isopropyl alcohol. Compositions employing these less volatile alcohols require less make-up solvent addition and are less subject to line plugging problems associated with rapid evaporation of the ink solvents. In general, inks of very low viscosity, particularly below about 3 cps. at 68° F., are preferred, although inks of about 5 cps. at 68° F. may be used very satisfactorily and, in extreme cases in which high driving pressure and relatively large nozzle orifice size (0.005 inches, for example) are employed, inks approaching a viscosity of 8–10 cps. at 68° F. may be used.

In each ink composition, the particular alcoholic component used must be in balanced proportion to the amount of water present in the ink, the proportion being within the limits previously set forth for satisfactory operation.

A small amount of ammonia or similar alkalizing agent, in the form of concentrated aqueous solution, is added to the ink to maintain the system in the pH range of 8.0 to 9.5. The preferred pH range of 8.6 to 8.8 is generally maintained by addition of about 1% by weight of concentrated ammonia solution (26° Baume) to the ink, but is is to be understood that the amount of his component or an equivalent substitute which is added may be varied in accordance with the pH requirements set forth above.

Control of the pH of the ink composition is important to the success of the ink in jet printing operations. Alkalinity in excess of that indicated by the stated pH range results in slow drying of the ink on a printed surface and relatively poor adhesion, whereas a pH below the acceptable range may seriously affect the stability of composition, causing sludging in the system and plugging of the printing jet orifices.

If the desired dye or pigment has a relatively limited solubility in the solvent media hereinbefore described, the composition may be modified by the inclusion of a moderate amount of an additional solvent in which the dye has a high solubility, which has a low surface tension and low viscosity, which is completely miscible with water and which has a suitable evaporation rate. Certain of the relatively low molecular weight glycol ethers, including ethylene glycol monomethyl ether (commonly known as methyl cellosolve), ethylene glycol monoethyl ether (commonly known as cellosolve), propylene glycol monomethyl ether and propylene glycol monoethyl ether, have proven to be eminently satisfactory in this regard and may be added to the ink composition in amounts up to about 30% by weight, as required to stabilize the coloring agent in solution. Amounts of the listed glycol ethers in excess of 30% by weight of the composition are to be avoided if the ink is to wet the surface of the metal printing substrate satisfactorily.

The Resin Component —The preferred resin component is dewaxed and bleached shellac,, or its equivalent, although any comparable resin having the requisite properties of solubility in the solvent medium and ability to anchor the color component on the metal surface could be satisfactorily utilized in the ink. In general, a high concentration of resin is desired in order to anchor the dye or pigment most firmly on the printed surface. Thus, up to and actually over about 7% by weight, based on the weight of the composition, to even about and more than 12% and, for given purposes and effects as hereinafter more full apparent, as much as 25% or so of the resin component may be empolyed satisfactorily in ink compositions in accordance with the present invention. The resin concentration, however, is limited by the increase in viscosity which results as the amount of resin in the composition increases.

Further, as the concentration of shellac-type resin increases, interaction between the resin and the coloring component may occur with resultant scumming or sludging of the ink. This phenomenon is particularly evident in those compositions which include substantial amounts of water. The problem cannot be overcome by elimination of the aqueous component, however, because some water is necessary in order to maintain the surface tension of the ink within the operative range to achieve proper wetting of the substrate. If the alcoholic component is primarily methyl alcohol, the ink may contain from about 1% to about 17% shellac, which provides effective pigment anchoring capacity within the preferred operative range of 1.75–5 cps. in overall ink viscosity heretofore mentioned in connection with nozzle orifices of about 0.003 inches in diameter. Somewhat higher shellac contents may be tolerated if the orifice size is increased proportionately as the viscosity increases due to the higher resin content. Thus, with orifice of about 0.005 inches in diameter, the shellac content may be as high as about 25% by weight, it being understood that, in inks of the higher shellac contents, the amount of water and of the higher alcohols will be maintained at a minimum compatible with the requirements of substrate wettability, drying speed and sludge prevention previously mentioned.

It has previously been noted that the use of ethyl and proply alcohols results in inks of higher viscosity than is obtained when methyl alcohol is the primary alcoholic solvent. Since an increase in the resinous component also tends to increase the viscosity, it will be apparent that, in order to maintain a desired viscosity level, less shellac will be utilized with propyl alcohol than with methyl alcohol as the solvent. For example, an ink composition containing, by weight, 2 % rhodamine dye
3 % ammonia
9.5 % shellac
9.5 % ethyl alcohol
19 % distilled water
58 % isopropyl alcohol had a viscosity at 68° F. of 5.2 cps. A similar viscosity was obtained by substituting methyl alcohol for the isopropyl alcohol and raising the shellac content to 17%. When ethyl alcohol was the sole alcoholic component, a viscosity of 5 cps. was obtained at a shellac content of 14%.

The Electrolyte Component. In order that the droplets of ink ejected from the nozzles may receive and hold the proper electrical charge, the ink must have a specific resistivity within a range from somewhat below 100 ohm cm. to about 1000 ohm cm., the preferred operative range being between about 150 and 300 ohm cm. It has been found that some of the ink compositions of this invention will naturally have a specific resistivity within the operable range without the necessity of adding an electrolytic component specifically for the purpose of adjusting the resistivity of the ink. In general, however, it has been found that optimum results are obtained if there is added to the ink an optional component which comprises a salt or mixture of salts which is soluble in the ink medium and which has no deleterious effects on the printing apparatus or on the printed substrate. Particularly satisfactory for this use are dimethylamine hydrochloride and lithium chloride, although other alkali metal chlorides, nitrates, sulfates and similarly soluble salts may also be used. Dimethylamine hydrochloride, which has a high solubility in the solvent media hereinbefore described, is of particularly utility because of this property.

The electrolyte component may be added in an amount which will be effective in lowering the specific resistivity of a given ink to the desired level. The effective amount of electrolyte will vary from zero to 2 or 3% or higher, depending on the original resistivity of the ink and on the resistivity desired. Amounts of the preferred electrolytes, dimethylamine hydrochloride and lithium chloride, in excess of about 1.5% are generally considered unnecessary and are therefore economically undesirable. Higher salt concentrations result in ink compositions of progressively lower resistivity. Although inks of very low specific resistivity are quite operable in the process of jet printing, resistivity values of less than about 100 ohm cms. present no particular advantage over those inks having a resistivity between about 100 and 300 ohm cms., the latter range of values being considered optimum. The alkali metal salts previously mentioned may also be used in concentrations up to about 2.0%, higher concentrations being both unnecessary and difficult to maintain because of the limited solubility of these materials in the solvent media used in the ink compositions of this invention. Because of their greater solubility in the alcohol-water solvent system, the preferred salts are dimethylamine hydrochloride and lithium chloride, used either alone or in combination, in a total salt concentration of about 1.5% by weight of the ink composition.

The Coloring Component —For satisfactory operation of the ink in jet printing apparatus, the coloring material must be in complete solution in the solvent medium. for this reason, only dyes which have sufficient solubility in water-methanol mixtures to give the desired color intensity are satisfactory for use in this invention. Dyes of the so-called basic type, including rhodamine, methyl violet, crystal violet, chrysoidine, auramine and Victoria blue, for example, have been found satisfactory for incorporation in the inks of this invention, and may be utilized in concentrations varying in accordance with the depth of color desired, with in the solubility limits of the particular dye, of course. If desired, a moderate amount of a solubilizing aid for the dye, such as a low molecular weight glycol ether, may be incorporated, if needed, to stabilize the dye solution in the ink composition. The basic dyes, rhodamine and methyl violet, for example, may be incorporated as the coloring agent in any amounts up to about 5% by weight of the ink, although 2 to 3% of either of these colorants is generally considered to give quite adequate color depth and higher percentages are therefore economically undesirable. Victoria blue may be utilized in amounts from about 0.5% up to its solubility limit of stable inks of about 1.5% by weight of ink if the solvent blend comprises principally a lower aliphatic alcohol and water. Addition of 20% by weight of a glycol ether of low molecular weight, such as a monomethyl or monoethyl ether of either ethylene glycol or propylene glycol, will increase the tolerance of the ink for Victoria blue dye up to about 2.5% without loss of stability against sludging or precipitation, and lesser amounts of any of the listed solubilizing solvents will increase the colorant solubility by expectedly lesser amounts.

The following examples are illustrative of ink compositions according to this invention which are effective in jet printing operations.

EXAMPLE 1.

To a mixture of 400 gm. fo methanol, 175 gm. of water, 9 gm. of 26° Baume ammonium hydroxide and 14.6 gm. of dimethylamine hydrochloride was added 21 gm. of rhodamine dye dissolved in 170 gm. of methanol together with a solution of 45 gm. of shellac in 105 gm. of ethanol.

The resulting ink composition had a viscosity of 2.0 cps. at 68° F., a resistivity of 140 ohm cm., a pH of 8.7 and a surface tension of 31–32 dyne cm. at 68° F.

The ink was used in the ink jet printing of indicia on the ends of aluminum cans containing beer. The printed indicia dried very quickly to form images displaying excellent adhesion to the substrate, high resistance to abrasion and excellent resistance to water. The images bled slightly when subjected to steam pasteurization. Substitution of an equal amount of lithium chloride for the dimethylamine hydrochloride gave equivalent results, the minute droplets of ink projected from the jet nozzles in each case readily accepting a satisfactory charge to undergo the desired degree of deflection in the electric field responsible for positioning the droplets on the substrate. Similar results may be obtained if auramine, chrysoidine, crystal violet or other basic dye is substituted for rhodamine in the above composition.

During more than 60 hours of operation of the jet printing units with the ink composition set forth above, evaporative losses from the ink supply system were compensated for by the addition, as needed, of a makeup composition containing 1100 ml. of methanol, 50 ml. of water and 26° Baume ammonia water in the amount of 20 ml. The 60 hour run was completed with a minimum adjustment of the apparatus to maintain optimum print quality.

EXAMPLE 2.

Seven (7) gm. of Victoria blue dye was dissolved in a mixture of 580 gm. of methanol, 220 gm. of water, 10 gm. of 26°Baume ammoniumhydroxide and 16 gm. of dimethylamine hydrochloride. To the above mixture was added 48 gm. of shellac dissolved in 112 gm. of ethanol.

The resulting ink composition had a viscosity of 2.0 cps. at 68° F., resistivity of 125 ohm cm., of pH of 9.2 and a surface tension of 31–32 dyne cm. at 68° F.

The above ink composition was utilized in ink jet printing operations similar to those described in Example 1 with equivalent results except that, in this case, the ink withstood pasteurization without bleeding or loosening of te image on the metal can surface. Substitution of an equivalent weight of lithium chloride for the dimethylamine hydrochloride gave equally good results. The makeup solution used in each case contained 1100 ml. of methanol, 75 ml. of water and 20 ml. of 26° Baume ammonia water.

In a minor modification of the above ink composition, it was found that satisfactory pH adjustment could be obtained with volatile, water miscible alkaylzing agents other then ammonium hydroxide, including methyl amine, dimethyl amine and diethyl amine. Alkali metal hydroxides may also be used but are considered somewhat less desirable for this purpose, since they tend to prevent the hardening of the resin component, which thereby remains gummy and the adhesion of the ink to the substrate is deleteriously affected.

EXAMPLE 3

The composition of Example 2 was modified by increasing the Victoria blue component to 14 gm. and by the addition of 220 gm. of ethylene glycol monomethyl ether as a solubilizing agent for the dye.

The ink composition had a viscosity at 68° F. of 1.95 cps., a surface tension at 68° F. of 32 dyne cm., a resistivity of 177 ohm cm.,and a pH of 8.2.

The resulting printing was of high quality and gave excellent results in terms of abrasion resistance, and water resistance was not deleteriously affected by pasteurization by steam. The jet printing apparatus operated throughout a testperiod of 144 hours without clogging or plugging in any section of the apparatus and without the necessity of any adjustment in the printing equipment, indicating a very desirably stable ink system. The overall stability of this ink against precipitation, sludging and clogging of the apparatus components is outstanding, due primarily to the solubilizing influence of the glycol ether of the coloring component. The ethylene glycol monomethyl ether may be substituted in equivalent amount in the above ink composition by ethylene glycol monethyl ether, propylene glycol monomethyl ether or propylene glycol monethyl ether without substantial change in viscosity, surface tension or resistivity of the ink and with equivalent results in the properties of the printed image.

EXAMPLE 4

To 300 gm. of isopropyl alcohol containing 12 gm. of dissolved rhodamine dye was added 100 gm. of distilled water and 100 gm. of a 50—50 solution of white shellac in ethyl alcohol. The pH of the dye solution was adjusted to 8.8 by addition of about 18 gm. of concentrated aqueous ammonium hydroxide. The resultant ink had a viscosity of 5.2 cps. at 68° F., a surface tension of 30–30 dynes at 68° F. and a specific resistivity of 650 ohm cm.

The above ink was used in the ink jet printing of aluminum cans with completely satisfactory results in terms of ink drop definition and scuff resistance of the printed image both before and after exposure of the cans to pasteurization. Due to the relatively high viscosity of the ink, the driving pressure of the printing system was raised substantially over that normally used with inks in the preferred viscosity range of 1.75–3 cps.

Similarly satisfactory results were obtained by substituting either n-propyl alcohol or ethyl alcohol for the isopropyl alcohol in the above composition. The ink incorporating normal propyl alcohol had a viscosity of about 5 cps., while the ethyl alcohol based ink had a viscosity of about 3.4 and therefore required a somewhat reduced driving pressure as compared to the inks containing propyl alcohol. In each case, the resistivity and surface tension measurements of the inks were substantially equal to those stated above, and the pH adjustment required about the same amount of ammonium hydroxide.

The drying rates of the inks containing the propyl alcohols were expectedly somewhat slower than those made with methyl an ethyl alcohols. Such slower drying inks are generally satisfactory only when speed of drying is not critical, as in situations where the printing operation is not followed immediately by pasteurization or other process which could disrupt or smear the printing.

EXAMPLE 5

The composition of Example 1 was modified by reducing the content of the electrolyte component, dimethyl amine hydrochloride, to 2.3 gm., or about 0.25% of the total ink composition. The resultant ink had a viscosity of 2.0 cps. at 68° F., at ph of 8.9, a surface tension of 31–32 dyne cm. at 68° F. and a specific resistivity of 520 ohm cm.

Use of this ink composition in a jet printing apparatus having nozzle orifices of just under 0.003 in. gave very satisfactory print quality with excellent adhesion and high resistance to abrasion and to the effects of water.

EXAMPLE 6

The composition of Example 1 was modified by eliminating the electrolytic component completely. The viscosity and surface tension of the ink remained unchanged, the ph was 9.0 and the specific resistivity was measured as 725 ohm cm. This ink was used in printing indicia on the end surfaces of aluminum beer cans and was found to operate satisfactorily throughout an uninterruped six day period, the printed indicia having satisfactory definition, adhesion to the substrate and resistance to abrasion and the effect of water.

EXAMPLE 7

A blue ink composition was prepared by dissolving 14 gm. of Victoria blue dye in a mixture of 580 gm. methyl alcohol, 220 gm. of ethylene glycol monomethyl ether, 220 gm. of water and 10 gm. of 26° Baume ammonium hydroxide. To this mixture was added 48 gm. of shellac dissolved in 112 gm. of ethyl alcohol.

The above ink composition, containing no added salt as an electrolytic component, had a specific resistivity of 630 ohm cm. and had a viscosity of 1.95 cps. at 68° F., a surface tension of 32 dyne cm. and a pH of 9.4. The ink performed satisfactorily in an ink jet printing apparatus to give printed indicia on aluminum beer can ends having satisfactory definition, abrasion resistance and resistance to steam pasteurization. The ink had good stability and presented no problems in line plugging or orifice clogging during extended operation of the apparatus.

The satisfactory operation of the inks of Examples 4–7, in which the specific resistivity exceeded 500 ohm cm. indicates that inks with very little or no added electrolyte may be utilized as long as the proper balance of the solvent system is maintained so that the surface tension, viscosity, pH and resistivity remain within the critical limits hereinbefore set forth, and the printed indicia meet the desired criteria with regard to the necessary properties and characteristics which have previously been described in detail.

Various other examples and modifications of the ink compositions of this invention might be cited or will suggest themselves to those skilled in the art, and it is intended that the scope of the invention be limited only as necessitated by the appended claims.

We claim:

1. An ink composition suitable for use in jet printing operations comprising a solution of the following components:
   a. between about 1 and 25 weight percent of shellac,
   b. between about 0.5 and 5 weight percent of a basic dye,
   c. between 0 and about 30 weight percent of a solvent modifier chosen from the group consisting of ethylene glycol monomethyl ther, ethylene glycol monoethyl ether, propylene glycol monomethyl ether and propylene glycol monoethyl ether,
   d. the remainder of said ink consisting of a blend of water and a lower aliphatic monohydric alcohol of no more than three carbon atoms, in a water-to-alcohol ratio of between 1 to 1.5 and 1 to 10, the proportions of said water and alcohol within such limits being such that said ink has a surface tension at 68° F. of between about 22 and 40 dyne cm., a viscosity at 68° F. of between about 1.75 and 5 cps., said ink having a pH of between 8.0 and 9.5 and a specific resistivity of less than 1000 ohm cm.

2. An ink composition suitable for use in jet printing operations consisting essentially of a solution of the following components:
   a. between about 1 and 17 weight percent of shellac,
   b. between about 0.5 and 5 weight percent of a basic dye,
   c. between 0 and about 30 weight percent of a solvent modifier chosen from the group consisting of ethylene glycol monomethyl ether, ethylene glycol monoethyl ether, propylene glycol monomethyl ether and propylene glycol mmonoethyl ether,
   d. the remainder of said ink consisting of a blend of water and a lower aliphatic monohydric alcohol of no more than three carbon atoms in a water-to-alcohol ratio of between 1 to 1.5 and 1 to 10, the proportions of said water and alcohol within such limits being such that said ink has a surface tension at 68° F. of between about 22 and 40 dyne cm., a viscosity at 68° F. of between about 1.75 and 5 cps., said ink having a pH of between 8.0 and 9.5 and a specific resistivity of between about 500 and 1000 ohm cm.

3. An ink composition suitable for use in jet printing operations consisting essentially of a solution of the following component:
   a. between about 1 and 12 weight percent of shellac,
   b. between about 0.5 and 5 weight percent of a basic dye,
   c. between 0 and about 30 weight percent of a solvent modifier chosen from the group consisting of ethylene glycol monomethyl ether, ethylene glycol monoethyl ether, propylene glycol monomethyl ether and propylene glycol monoethyl ether,
   d. the remainder of said ink consisting of a blend of water and a lower aliphatic monohydric alcohol of no more than three carbon atoms in a water-to-alcohol ratio of between 1 to 1.5 and 1 to 10, the proportions of said water and alcohol within such limits being such that said ink has a surface tension at 68° F. of between about 22 and 40 dyne cm., a viscosity at 68° F. of between about 1.75 and 3 cps., said ink having a pH of between 8.0 and 9.5 and a specifice resistivity of less than 1000 ohm cm.

4. An ink composition according to claim 1, wherein said alcoholic component is a blend of ethyl alcohol and a propyl alcohol and said viscosity is between 3 cps. and about 5 cps. at 68° F.

5. An ink composition in accordance with claim 3, wherein said alcoholic component is a blend of methyl and ethyl alcohols and said viscosity is between 1.90 and 3 cps. at 68° F.

6. A ink composition according to claim 1 containing between 1 and 17 weight percent of the shellac.

7. An ink composition according to claim 1 containing between about 1 and 12 weight percent of the shellac.

8. An ink composition in accordance with the ink composition of claim 1, as a composition consisting essentially of the specified components excepting, in addition thereto and in combination therewith, to also contain as an added ingredient therein:
   e. an electrolyte in an amount, below about 2 weight percent, effective to significantly affect the specific resistivity of said ink composition.

9. An ink in accordance with claim 8, wherein the amount of shellac is between about 1 and about 17 weight percent and the ink has a viscosity at 68° F. of between about 1.75 and 5 cps.

10. An ink in accordance with claim 9, wherein the amount of shellac is between about 1 and about 12 weight percent and the ink has a viscosity between about 1.75 and 3 cps. at 68° F. and a specific resistivity below about 200 ohm cm.

11. An ink in accordance with claim 10, wherein the ink contains an electrolyte chosen from the group consisting of dimethylamine hydrochloride and lithium chloride 12. An ink in accordance with claim 8, wherein the ink contains an electrolyte chosen from the group consisting of dimethylamine hydrochloride and lithium chloride 13. An ink composition suitable for use in a jet printing operation consisting essentially of a solution of the following components:
   a. between about 1 and 12 weight percent of shellac;
   b. an electrolyte in an amount below about 2 weight percent, effective to significantly affect the specific resistivity of said ink composition;
   c. between about 0.5 and 5 weight percent of basic dye;
   d. between about 0 and 30 weight percent of ethylene glycol monomethyl ether; and
   e. the remainder of said ink consisting of a blend of water and a lower aliphatic monohydric alcohol in a water-to-alcohol ratio of between 1 to 1.5 and 1 to 10, the proportions of said components within said limits being such that said ink has a surface tension at 68° F. of between about 22 and 40 dyne cm., a viscosity at 68° F. of between about 1.75 and 3.0 cps., a resistivity of less than about 200 ohm cm. and a pH of between 8.0 and 9.5.

14. An ink in accordance with claim 13, wherein said electrolyte is chosen from the group consisting of dimethylamine hydrochloride and lithium chloride, said lower aliphatic alcohol is chosen from the group consisting of methanol and a blend of methanol and ethanol, and said water-to-alcohol ratio is between 1 to 1.5 and 1 to 5.

15. An ink in accordance with claim 14, wherein said coloring component is a Victoria blue dye.

16. An ink in accordance with claim 15, wherein said Victoria blue dye is present in an amount between 0.5 and 2.5 weight percent, ethylene glycol monomethyl ether is present in an amount between 10 and 30 weight percent, and said water-to-alcohol ratio is about 1 to 3.0.

17. An ink in accordance with claim 14, wherein said coloring component is rhodamine dye in an amount between about 2 and 3 weight percent and said water-to-alcohol ratio is about 1 to 3.7.

18. An ink composition suitable for use in an ink jet printing apparatus and having a surface tension at 68° F. of between about 22 and 40 dyne cm., a pH adjusted to between 8.0 and 9.5 ammonium hydroxide, a resistivity of less than about 500 ohm cm., and a viscosity at 68° F. of between about 1.75 and 3 cps., said ink consisting essentially of shellac in an amount between about 1% and by 12% weight of the ink, an electrolyte chosen from the group consisting of dimethylamine hydrochloride and lithium chloride in an amount between about 0.25% and 2% by weight of the ink, a colorant selected from the group consisting of basic dyes in an amount between 0.5% and 5% by weight of the ink, and the remainder of said ink consisting essentailly of a blend of water and lower aliphatic alcohols in a water-to-alcohol ratio between 1 to 1.5 and 1 to 10.

19. An ink composition suitable for ink jet printing operations consisting essentailly of a solution of about:
   14 parts by weight of Victoria blue dye;
   580 parts by weight of methanol;
   220 parts by weight of water;
   10 parts by weight of 26° Baume ammonium hydroxide;
   16 parts by weight of lithium chloride;
   48 parts by weight of shellac;
   112 parts by weight of ethanol; and
   220 parts of weight of ethylene glycol monomethyl ether.

20. An ink composition suitable for use in jet printing operations comprising a solution of the following components:
   a. between about 1 and 25 weight percent of an alcohol soluble resin component which is adhesive to various surfaces including metal;
   b. between about 0.5 and 5 weight percent of a basic dye;
   c. between 0 and about 30 weight percent of a solvent modifier chosen from the group consisting of ethylene glycol monomethyl ether, ethylene glycol monoethyl ether, propylene glycol monomethyl ether and propylene glycol monoethyl ether; and
   d. the remainder of said ink consisting of a blend of water and a lower aliphatic monohydric alcohol of no more than three carbon atoms, in a water-to-alcohol ratio of between 1 to 1.5 and 1 to 10, the proportions of said water and alcohol within such limits being such that said ink has a surface tension at 68° F. of between about 22 and 40 dyne cm., a viscosity at 68° F. of between about 1.75 and 5 cps., said ink having a pH of between 8.0 and 9.5 and a specific resistivity of less than about 1000 ohm cm.

21. An ink composition according to claim 20, wherein said alcoholic component is a blend of ethyl alcohol and a propyl alcohol and said viscosity is between 3 cps. and about 5 cps. at 68° F.

22. An ink composition according to claim 20 containing between about 1 and 17 weight percent of the resin.

23. An ink composition according to claim 20 containing between 1 and 2 weight percent of the resin.

24. An ink composition in accordance with the ink composition of claim 20, as a composition consisting essentially of the specified components excepting, in addition thereto and in combination therewith, to also contain as an added ingredient therein:
   e. an electrolyte in an amount, below about 2 weight percent, effective to significantly affect the specific resistivity of said ink composition.

25. An ink in accordance with claim 24, wherein the amount of resin is between about 1 and 17 weight percent and the ink has a viscosity at 68° F. between about 1.75 and 5 cps.

26. An ink in accordance with claim 25, wherein the amount of resin is between about 1 and about 12 weight percent and the ink has a viscosity between about 1.75 and 3 cps. at 68° F. and a specific resistivity below about 200 ohm cm.

27. An ink in accordance with claim 26, wherein the ink contains an electrolyte chosen fron the group consisting of dimethylamine hydrochloride and lithium chloride.

28. An ink in accordance with claim 24, wherein the ink contains an electrolyte chosen from the group consisting of dimethylamine hydrochloride and lithium chloride.

* * * * *